Patented Sept. 5, 1939

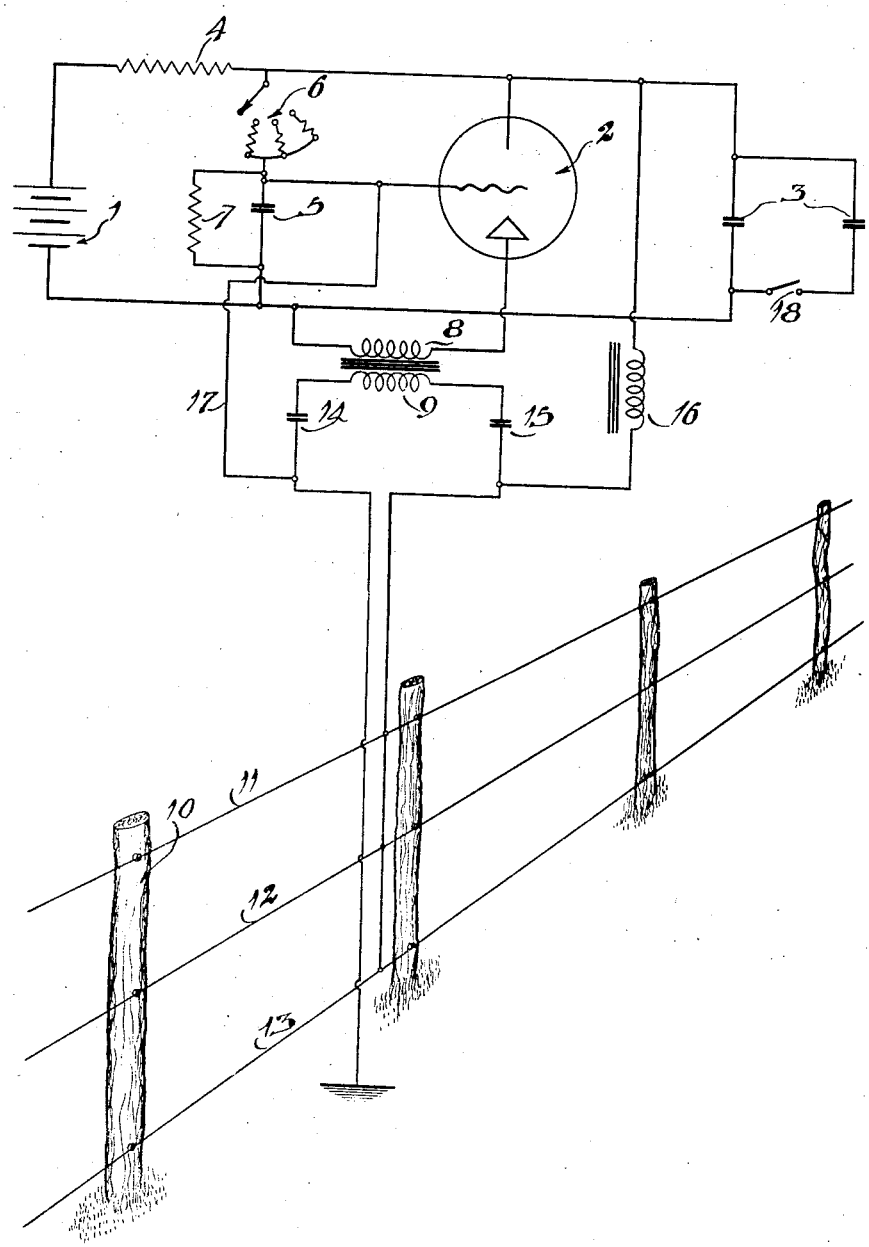

2,172,050

UNITED STATES PATENT OFFICE 2,172,050

APERIODIC CURRENT

Walter R. Mayberry, Cincinnati, Ohio, assignor to The Commonwealth Manufacturing Corporation, Cincinnati, Ohio, a corporation of Ohio Application May 11, 1938, Serial No. 207,411

16 Claims. (Cl. 256—10)

This invention relates to devices for providing electrical impulses at intervals of predetermined periods. The impulses are used for electrifying other devices or instrumentalities, for signaling or timing, or for sounding alarms and like purposes.

One specific class of devices to which the present invention particularly is suitable is exemplified by the so-called fence protectors, or "electric fences". These machines are used by farmers and dairymen for the purpose of electrifying fences around pastures and yards to protect them from being destroyed or trampled down by cattle or horses, and to protect animals from ill effects of eating excessive amounts of green crops should they escape the premises. Upon the same principle that wire having barbs is used for fencing to ward off the animals by pricking them, the fence protectors are arranged to send electrical impulses periodically along the fence wire or wires to shock the animals and thus keep them away from the fence. The electrical impulses are of high voltage, but of low current, so as to avoid danger of burning or permanent injury; also, periodic rather than continuous current is employed to permit an animal to relax and move from the fence after being shocked, should the shock during the active interval momentarily stun its nervous system. The electrical current used in the devices usually, though not necessarily, is provided from dry cell or storage batteries.

The fence protectors which have been used in the past all have employed mechanical systems having moving parts to control the switching operation from active to inactive electrical phases. In one of these devices, for instance a ball actuated by a solenoid to travel in a trackway, is used for switching control. In still other devices pendulum mechanisms, see-saw mechanisms, and similar movements are used to control switch closure at periodic intervals.

These mechanical movements obviously are objectionable in devices employed for such purposes. The fence protectors usually are operated continuously day and night, and receive little care or attention. Depending upon the location of the fences they serve to electrify, the devices frequently are located out of doors, within a simple box or housing, and are expected to continue to operate during the summer and winter months under such adverse conditions. Even in the simplest system the moving parts require frequent lubrication and tend to become out of adjustment. In fact, in actual experience, it has been found that the farmers frequently discard the protectors rather than bother to provide the attention they require.

Moreover, all of the devices available at present continuously consume current to effect their operation. If ordinary dry cell batteries are employed they become exhausted, usually in a period of two or three months' time, and need be replaced. The apparatuses must, therefore, be inspected from time to time to make sure, not only that they are in working order, but that the proper current supply is available.

The objective of the present invention has been to provide a fence protector free of moving parts and one which is operable continuously and reliably under adverse conditions, without requiring constant attention.

An objective of the invention also has been to provide a device requiring less frequent replacement of batteries than the devices which have been available. In general, it has been sought to provide apparatus essentially immune to adverse atmosphere and weather conditions, substantially independent of maintenance, care and attention, and one consuming current only at the times when animals are in actual contact with the fence being protected, but not otherwise.

Briefly speaking, the present invention is based upon the concept of employing a cold cathode tube as an instrumentality for effecting periodic or aperiodic discharge of electrical current from an electrical reservoir into the fence wires. The tube is one partially filled or one containing an ionizable gas and having at least a pair of spaced electrodes. Electrical current from a low potential source, such as a battery, is fed into the reservoir. When predetermined electrical conditions are set up within the tube then it relaxes to permit the current to flow or surge from the reservoir and across the tube electrodes. The electrical energy flowing through the tube is then transformed to high voltage current and this, in turn, is passed to the fence wires to be electrified.

According to the invention also, a high potential circuit including the reservoir is employed for furnishing electrical energy to the fence and a low potential circuit, including the source of current, is employed for furnishing electrical energy to the reservoir. The tube is used as the valve controlling the discharges of electrical energy from the high potential circuit to the fence or barrier. However, the low potential circuit also is employed for setting up the predetermined electrical conditions within the tube. Thus, broadly speaking, the low potential circuit controls the relaxation of the tube and the tube controls the discharge of energy from the reservoir.

In another respect, the concept has been to employ the animal, or other external means, as the "trigger" for bringing the fence protector device into operation, that is, providing an electrical fence protector which is normally inoperative when in circuit with the fence being protected, but which becomes actively operative to send impulses of electrical current to the barrier at such times when the barrier needs electrification.

In this apparatus the high potential circuit and the low potential circuit also are employed, and the barrier to be electrified or the fence to be charged is an element common to each of them. The low potential circuit controls the release of energy from the high potential circuit by opening or energizing the electronic valve which normally dams the flow of current from the high potential circuit to the barrier. However, in this case, the low potential circuit is a partially completed circuit and is subject to completion through the barrier. When the low potential circuit is completed as, for instance, when the barrier is contacted by an animal in contact with the ground, then low potential current flows through it to effect energization of the valve, which opens to furnish high potential energy to the barrier. The paths of low and high potential current are defined and delineated from one another by elements which prevent the passage of high potential current through the low potential circuit and the low potential current through the high potential circuit.

In either instance the low potential circuit includes a "trigger condenser" in circuit connection with the electronic valve. When this "trigger condenser" is charged, from the source of current, then the predetermined electric conditions are set up within the valve to cause it to relax or open. If the low potential circuit is complete at all times, independently of the barrier, then the trigger condenser is charged and the tube is relaxed at periodic intervals, so the device operates continuously, but if the low potential circuit is partially completed, subject to completion through the barrier and ground, then the "trigger condenser" is charged (and the valve opens) aperiodically, or at such times that the circuit between the barrier and the ground is closed through contact by an animal or otherwise, so the device operates only when needed.

For convenience in describing the apparatus the term "reservoir" hereinafter is used to designate the electrical system employed to supply electrical current to the electronic tube, for passage therethrough, and the term "electronic valve" is employed to designate this tube which governs the flow of current from the reservoir to the fence. The term "trigger" is employed to designate the function by which the contact of an animal with the fence initiates the actuation of the apparatus. In the apparatus a battery preferably is used as the source of electrical current and a condenser, or a series of them, is used as the reservoir from which the impulse of current for electrifying the fence is released upon valving operation of the tube.

The preferred circuit employed in the practice of the invention is illustrated diagrammatically in the figure of the drawing. The variety of modifications to which this circuit and the present invention is susceptible is not shown in the drawing for the reason that, by virtue of the foregoing explanation of the principles of the invention and the following detailed explanation of the preferred embodiment of it, those skilled in the art will be able to make such modifications should they be desired for particular purposes.

For purposes of explanation, the circuit of the figure conveniently may be divided into three sub-circuits. The first of these may be termed the "trigger charging circuit"; this includes the fence and the animal and functions to start the fence protector device into operation. The next circuit, termed the "trigger circuit" comprises a "trigger" condenser in which an initiating charge is built up to initiate operation of the valve or "fire" it, when the trigger charging circuit is closed. The third subcircuit, which may be termed the "main discharge circuit", includes the main condenser reservoir, the valve through which the current passes from the reservoirs and the transformer to convert the current before it is applied to the fence. The circuits, of course, are all in interconnection with elements in common between them. While the apparatus is placed in operation by virtue of the circuit connection of the animal at the discharge end of the circuit, for purposes of description it is convenient, first, to describe the apparatus beginning at the source of current, and then to describe the respective phases of operation.

Electrical energy is supplied from the direct current source 1; this may, for example, be a dry cell battery or an alternating current rectifier capable of supplying a voltage sufficient to exceed the breakdown or relaxation voltage of the tube as for example, 100 volts. The electronic valve is indicated generally at 2 and comprises plate, grid and cathode elements. The plate and cathode elements of this tube are connected in parallel with the main reservoir condenser 3 and the source of current 1, with the resistance 4 in series with the source of current. A "trigger" condenser 5 is in partial series circuit connection with the source of current 1. A switch and means for controlling frequency, as hereinafter discussed, are indicated generally at 6, and a resistance 7 is shunted around the "trigger" condenser 5.

The primary winding 8 of the transformer is connected in series with the cathode of the valve. One terminal of the secondary 9 of the transformer is connected to the ground and the other terminal is connected to the fence to be electrified. The transformer is preferably of the high reactance type constructed so as to limit the current from the secondary to a value not exceeding approximately 10 milliamperes. One or more of the wires 11, 12 and 13 of the fence may be electrified. Usually one is all that is necessary though two wires are charged in fences about enclosures containing pigs and the smaller animals. The fence wires are carried on posts indicated at 10.

Both terminals of the transformer secondary include blocking condensers 14 and 15 connected in series. Also, the secondary "ground" terminal, at a point beyond the condenser 14 from the winding, is connected to the grid of the valve through the lead 17, and the secondary "fence" terminal, at a point beyond the condenser 15 from the winding, is connected, through a choke coil or inductive impedance 16, to the plate of the valve.

The operation of the apparatus briefly is as follows:

When an animal comes into contact with the fence, then the trigger charging circuit is closed, and current flows from the plus terminal of the battery through the resistance 4, through the choke coil 16, to the fence, through the animal and ground, through the condenser 5 and back to the negative terminal of the battery. The condensers 14 and 15 constitute an almost infinite resistance and serve to block the passage of the direct current from the battery through the transformer secondary winding. However, the condenser 5 is of relatively low capacitance and hence is charged by the current flowing during this phase. The path of energy just described constitutes what has been termed the "trigger charging circuit".

When the charge built up in the condenser 5 equals the breakdown voltage of the grid cathode circuit then a flash or glow occurs within the electron tube 2 and current is permitted to pass through this circuit, from the condenser 5 to the grid of the tube, from here to the cathode, through the primary of the transformer, and back to the condenser 5. This path completes the "trigger circuit".

Meanwhile, however, the battery 1, being in parallel circuit connection with the reservoir condenser 3, has charged this condenser. When an initiating discharge takes place in the tube through release of energy from the condenser 5, and through the flash of current from the grid to the cathode in the trigger circuit, then the gas in the tube is ionized to permit the main discharge to take place. Thus the reservoir condenser 3 discharges through the plate to the cathode of the valve, then through the primary of the transformer and back to the condenser. This path constitutes the "main discharge" path. The surge of current sent through the primary of the transformer energizes the secondary winding wherein a high voltage current is built up. This high voltage current now passes the blocking condensers 14 and 15 to electrify the animal in contact with the fence.

The interval of time taking place upon contact of the animal with the fence to electrification of the animal by the fence is practically instantaneous, and the surge of current to which the animal is subjected likewise is of exceedingly short duration. However, when the animal has been shocked, it breaks contact with the fence, and the apparatus again is in idle condition, no current passing from the battery except that required to bring up a charge in the reservoir condenser 3 to be released at the next time of circuit actuation. The animal keeps getting shocked until it leaves the fence.

In wet weather better contact between the animal and the fence is obtained, and the shocking effect is much more noticeable. Therefore, only one reservoir condenser 3 is employed in the circuit. However, in dry weather the electrical conduction is poorer, and the electrifying charge is made higher for equal effect. Therefore, the capacity of the reservoir is increased; that is a pair of reservoir condensers are connected in parallel with a "weather condition" switch 18 being used for circuiting both condensers when desirous.

The resistance 7, shunting the condenser 5, is employed to prevent unintentional grounding and continuous operation of the circuit which might result during adverse weather conditions. For instance, the moisture prevalent during exceedingly wet seasons may have the effect of partially grounding the fence just as it normally is intended to be grounded by an animal. Under such conditions current may flow in the trigger charging circuit. While this current flow usually would be small, still it might be sufficient eventually to charge the condenser 5 and thus the circuit could be fired without contact of an animal with the fence. In this event no harm would be done but energy would be drawn from the battery, and as a useful, though by no means necessary precaution, the condenser is shunted to prevent uncontrolled discharge. The resistance 7 is effective to permit the small "leakage" current to leak past the condenser 5 and not accumulate within it, but is ineffective to bypass the greater current flowing when good circuit connection is obtained. In this way, inadvertent grounding and unintentional operation of the apparatus is prevented.

The blocking condensers 14 and 15 are effective to pass high voltage current surges but are ineffective to pass low voltage direct current, and these, likewise, prevent the circuit from firing at repeated intervals through completion of the circuit through the transformer secondary 9. The choke coil 16 being effective to pass direct current but not high surges prevents the secondary of the transformer from discharging back to the condenser or to the other circuits.

In normal operation, the switch 6 is in the off-position, as shown in the drawing. With the resistance 4 being fixed as to value the circuit will fire at fixed intervals as long as the animal maintains contact with the fence. However, it has been determined that the magnitude of the resistance in the circuit charging the condenser 5, controls the frequency at which the valve will operate. By decreasing the circuit resistance, as for instance, the resistance 4, the frequency of operation of the valve is increased. Thus, by making resistance 4 a variable resistance, the means is provided for controlling the rapidity with which impulses are sent out to the animal making contact with the fence. Ordinarily it is convenient to fix the resistance 4 at a value so that the frequency of impulses sent to the fence and through the animal making contact with it, is about 60 cycles per minute.

If desirous, one, or a series of resistances of different values may be provided in circuit series connection with the condenser 5 and points of the switch 6, so that the operator, by moving the switch contact from off-position to one other of the contacts, may cause the apparatus to operate continuously, by completing the low potential circuit independently of the presence of an animal in contact with the fence. Resistances of different value enable the operator to adjust the frequency or periodicity of the pulsations. While the concept of employing the animal as the controller initiating its own electrification obviously is an important feature of the invention, there are instances when the farmers, for example, desire the devices to operate continuously. Thus, the invention comprehends electrical circuits operable continuously, as well as those whose operation is contingent upon the animal making contact with the fence.

In using the device, it is preferable that the fence wire or wires be insulated from the posts to prevent grounding of the wires during the wet weather. If the switch 6 is left in the off-position then the battery does not supply energy except during the relatively infrequent periods when an animal actually is in contact with the fence. In this manner the life of the battery is very much prolonged. In fact the sole factor governing the life of the battery is its shelf life, that is to say, the life of the battery is the same as that which it would have been had it been stored and not used at all.

An advantage of the invention is that only a very small amount of apparatus is required to supply the desired result. This apparatus is arranged in a simple circuit and may be constructed at very low cost. Since no moving parts of any nature are employed, no attention other than the ordinary replacement of batteries from year to year is required. The current consumption is very small. In fact the current consumed by the device is approximately 1/100 the amount consumed by the typical mechanical devices; this small consumption of current is accounted for by the fact that all the current drawn from the battery is used entirely for electrification, whereas most of the current consumed by mechanical devices is lost in overcoming friction.

The invention has been shown and described particularly in relation to the purpose for which it was originally intended, though the principle of the invention and the circuits which are described are useful for other and wholly unrelated purposes, such as timing, signaling and flashing. In general, wherever there is need for periodic electrical impulses of low frequency, either continuously or in mechanical response to a pilot control, the apparatus is suitable.

If the apparatus is desired for signaling or alarm purposes where high voltage currents are not necessary, then the current of the main discharge need not be amplified but may be used for controlling a signaling system or mechanism. By virtue of the fact that the "trigger" charging circuit is operable upon low voltage direct current and is effective to control the operation of the circuit at predetermined intervals in response to external influence, the apparatus is particularly suitable for such controls since no current is consumed during the inactive phases.

Having described my invention, I claim:

1. An electrical apparatus including a gas filled tube having a plurality of electrodes, a source of current, a resistance in series connection with the source of current, a condenser in parallel circuit connection with two respective electrodes of the tube and the source of current, a second condenser in series circuit connection with another electrode of the tube and the source of current, a transformer having a primary and a secondary winding, the primary winding being in series circuit connection with one of the respective electrodes of the tube, and the secondary being in series circuit connection with the other respective electrode of the tube and the said second condenser, and means in the transformer secondary for blocking the passage of direct current therethrough, and for passing high surges of current therethrough.

2. An electrical barrier comprising a source of direct current, a resistance in series with the source of current, a gas filled tube having a plate, a grid, and a cathode, a transformer having a primary winding in series circuit connection with the cathode and plate of the tube and having a secondary winding, a condenser in circuit connection with the plate and cathode and for discharging through the primary of the transformer, a "trigger" condenser in partial circuit connection with the source of current and the grid of the tube, and effective to ionize the gas within the tube upon accumulation and release of an electrical charge at least equaling the breakdown voltage of the tube, to permit the first condenser to discharge across the plate and cathode through the primary of the transformer, and means, including a barrier to be electrified in connection with the secondary of the transformer, for completion of the circuit from the source of current to the second condenser, the means including capacitance effective to prevent the passage of direct current through the secondary of the transformer, and also including impedance effective to prevent the passage of surges of current from the secondary of the transformer back through the condenser.

3. An electrical barrier comprising a barrier to be electrified, a source of direct current, a resistance in series with the source of current, gas filled electronic valve having a grid, a plate, and a cold cathode, a transformer having primary and secondary windings, with the primary winding in circuit connection with the plate and cathode and with the secondary winding of the transformer in circuit connection with the barrier to be electrified, a capacitance in parallel circuit connection with the plate and cathode of the tube and the source of current, and effective to discharge through the primary winding of the transformer, a second capacitance in partial circuit connection with the grid of the tube and the source of current, and effective to ionize the gas within the tube to permit the first condenser to discharge, a resistance shunting the second capacitance to bypass leakage currents, and means including said barrier to be electrified for completing the said partial circuit, and also including electrical means for blocking the passage of current from the source of current through the secondary winding, and electrical means for blocking the passage of the discharge current from the first condenser through the secondary of the transformer.

4. An electrical apparatus including a source of direct current, a three-electrode gas filled tube, a resistance in series with the source of current, a reservoir condenser in circuit connection with the source of current and two elements of the tube, to discharge through the tube when the tube is energized, a transformer having a primary winding and a secondary winding, with the primary winding in the circuit constituted by the condenser and the said tube electrodes, to receive the discharge from the condenser, a barrier to be electrified, in circuit connection with the secondary of the transformer, and means for energizing the tube including a trigger condenser in circuit connection with the remaining electrode of the tube and in partial circuit connection with the source of current and the barrier for circuit completion through the barrier.

5. A safety device comprising a barrier, a low potential circuit and a high potential circuit, both connected to said barrier, a break in the low potential circuit, one terminal of which is the barrier so that the low potential circuit is established when the barrier is contacted, and means including a cold cathode tube and capacitance set in operation by the closing of the low potential circuit for actuating the high potential circuit to charge the barrier with a shock administering current.

6. A safety device including a barrier adapted to be contacted, a low potential circuit connected to said barrier and adapted to be closed by contacting the barrier, a capacity associated with the low potential circuit, said capacity adapted to be charged by the closing of the low potential circuit, a gas filled electronic tube valve connected to the capacity, associated with the low potential circuit, and adapted to be ionized by the discharge of said capacity, and a capacity adapted to discharge a high potential current through said tube valve after the tube valve is ionized by the closing of the low potential circuit.

7. In an electrical apparatus having a source of direct current, a resistance in series with the source of current, a gas filled tube having an anode, a cathode and a grid, a reservoir condenser, a trigger condenser and a transformer having primary and secondary windings, a high potential circuit including the source of current, the anode and cathode of the tube, the reservoir condenser and primary of the transformer in circuit connection for discharge of the reservoir condenser across the anode and the cathode of the tube and through the primary of the transformer when the tube is energized, a circuit to be electrified including the secondary of the transformer, and a partially completed low potential circuit for energizing the tube including the source of current, a trigger condenser, the grid of the tube, and the circuit to be energized, through which the partial circuit is adapted to be completed.

8. Electrical apparatus for providing aperiodic currents comprising a source of direct currents, a resistance in series with the source of current, a high potential circuit including a reservoir condenser connected for charging by the source of current, and a cold cathode gas filled tube controlling discharges of high potential current from the reservoir condenser when the tube is energized, a low potential circuit including a trigger condenser, in partial circuit connection with the source of current effective for controlling energization of the tube, a transformer having a primary winding in connection with the high potential circuit and a secondary winding in connection with the low potential circuit, and means for blocking high potential current from the low potential circuit and low potential current from the high potential circuit.

9. Electrical apparatus for providing aperiodic currents comprising a source of direct current, a resistance in series with the source of current, a high potential circuit including a reservoir condenser connected for charging by the source of current, and a cold cathode gas filled tube controlling discharge of high potential current from the reservoir condenser when the tube is energized, a low potential circuit including a trigger condenser, in partial circuit connection with the source of current effective for controlling energization of the tube, and a shunt resistance around the trigger condenser for bypassing leakage currents in the low potential circuit, a transformer having a primary winding in connection with the high potential circuit and a secondary winding in connection with the low potential circuit, and means for blocking high potential current from the low potential circuit and low potential current from the high potential circuit.

10. A device for providing electrical pulsations to a barrier, comprising a source of direct current, a gas filled tube having an anode, a cold cathode and a grid, a reservoir condenser in circuit connection with the source of current to be charged thereby and in circuit connection with the anode and cathode of the tube to discharge therethrough when the gas in the tube is ionized, a transformer having a primary winding in the circuit constituted by the condenser and the anode and cathode of the tube, to receive the discharge from the condenser and having a secondary connected to the barrier, means permitting surges of current to pass from the secondary of the transformer to the barrier and preventing the passage of direct current from the barrier through the secondary of the transformer, and an incompleted circuit which is subject to completion through the barrier, including the barrier, the grid of the tube, a trigger condenser for energizing the tube and the source of current.

11. An electrical circuit comprising a three-electrode gas filled tube, a source of direct current, a resistance in series with the source of current, a reservoir condenser in parallel circuit connection with two respective electrodes of the tube and with the source of current, a barrier, a trigger condenser in circuit connection with the remaining electrode of the tube and in partial circuit connection with the source of current through the barrier, whereby the trigger condenser is charged when the partial circuit connection to the source of current is completed through the barrier and is effective when charged to ionize the gas within the tube to permit the reservoir condenser to discharge across the said respective electrodes of the tube and provide an electrical impulse.

12. An electric fence device comprising a source of direct current, a resistance in series with the source of current, a gas filled tube having an anode, a cathode and a grid, a reservoir condenser in circuit connection with the source of current so as to be charged thereby and with the anode and cathode of the tube, to discharge therethrough when the tube is energized, and means for energizing the tube including a trigger condenser connected to the grid of the tube and in partial circuit connection with the source of current and the fence to be protected, with the trigger condenser being in circuit connection with the ground so that the grounding of the fence completes the partial circuit connection to the trigger condenser to energize the tube and permit the reservoir condenser to discharge.

13. An electrical circuit for producing electrical pulsations comprising a three-electrode gas filled tube, a source of direct current, a resistance in series with the source of current, a condenser in parallel circuit connection with two electrodes of the tube and with the source of current, an external circuit to receive electrical pulsations and means actuable in response to predetermined condition influencing the external circuit for applying across the remaining electrode of the tube, and another electrode thereof, a voltage exceeding the breakdown voltage of the tube to ionize the gas therein and permit the condenser to discharge across the two electrodes of the tube which are in parallel circuit connection with the condenser, the said means including a second condenser in partial circuit connection with the said remaining electrode of the tube and the source of current and in connection with the external circuit for completion of the partial circuit to the condenser when the external circuit is influenced.

14. A safety device comprising a barrier adapted to be contacted, a low potential circuit adapted to be closed by the contacting of the barrier, a high potential circuit also connected to said barrier, and electrical trigger means, including a cold cathode tube, which is adapted to be actuated by the closing of the low potential circuit, to release a shock administering current in the high potential circuit.

15. A safety device comprising a barrier adapted to be contacted, a low potential circuit adapted to be closed by the contacting of the barrier and including a condenser and a source of current in partial circuit with the condenser for charging the condenser when the barrier is contacted, a high potential circuit also connected to said barrier, and electrical trigger means including a cold cathode tube containing an electrode in circuit with said condenser for actuation thereby to release a shock administering current in the high potential circuit.

16. An electrified fence device comprising a fence adapted to be contacted, a low potential circuit adapted to be closed by the contacting of the fence, a high potential circuit also connected to said fence, and electrical trigger means including a cold cathode tube which is adapted to be actuated by the closing of the low potential circuit to release a shock administering current in the high potential circuit, the low potential circuit including a source of current, and a capacitance in connection with an electrode of said cold cathode tube for producing a discharge in said tube when the low potential circuit is closed, and the high potential circuit including another condenser connected to discharge through said tube upon discharge of the first condenser and also including a transformer for providing high potential current.

WALTER R. MAYBERRY.